(12) United States Patent
Maskatia et al.

(10) Patent No.: US 7,166,988 B2
(45) Date of Patent: Jan. 23, 2007

(54) PORTABLE ELECTRONIC APPARATUS INCLUDING DETACHABLE SYSTEM AND EXPANSION MODULES

(75) Inventors: Arif Maskatia, Milpitas, CA (US); Phil Mummah, Redwood City, CA (US); Mark Handa, Danville, CA (US)

(73) Assignee: Acer Incorporated, Taipei Hsien (TW)

( * ) Notice: Subject to any disclaimer, the term of this patent is extended or adjusted under 35 U.S.C. 154(b) by 210 days.

(21) Appl. No.: 10/788,317

(22) Filed: Mar. 1, 2004

(65) Prior Publication Data

US 2005/0189922 A1    Sep. 1, 2005

(51) Int. Cl.
*H01M 10/46* (2006.01)

(52) U.S. Cl. ........................ 320/116; 320/138
(58) Field of Classification Search ............... 320/106, 320/107, 110, 114, 115, 116, 138
See application file for complete search history.

(56) References Cited

U.S. PATENT DOCUMENTS 5,963,014 A * 10/1999 Chen .......................... 320/110
6,137,260 A * 10/2000 Wung et al. ................. 320/116

* cited by examiner

Primary Examiner—Edward H. Tso
(74) Attorney, Agent, or Firm—Pillsbury Winthrop Shaw Pittman LLP

(57) ABSTRACT

A portable electronic apparatus includes first and second modules, and a control unit. The first module includes a first charging circuit to be coupled to a first power source, and a first battery unit coupled to the first charging circuit. The second module is connected removably to the first module, and includes a second charging circuit to be coupled to a second power source, and a second battery unit coupled to the second charging circuit. The control unit enables the first and second battery units to be charged independently and respectively through the first and second charging circuits using the first and second power sources when the second module is disconnected from the first module, and enables the first and second battery units to be charged through the first charging circuit using the first power source when the second module is connected to the first module.

10 Claims, 3 Drawing Sheets

PORTABLE ELECTRONIC APPARATUS INCLUDING DETACHABLE SYSTEM AND EXPANSION MODULES

BACKGROUND OF THE INVENTION

1. Field of the Invention

The invention relates to a portable electronic apparatus, more particularly to a portable electronic apparatus that includes detachable system and expansion modules, each of which includes a charging circuit and a battery unit.

2. Description of the Related Art

A conventional portable electronic apparatus includes a notebook computer system module and an expansion module connected removably to the notebook computer system module. The notebook computer system module includes a charging circuit coupled to a power source, a battery unit coupled to the charging circuit, and a load, such as a touch control display panel, a motherboard, a central processing unit, and a primary hard disk drive. The battery unit of the notebook computer system module is charged through the charging unit using the power source. The expansion module includes a battery unit, a mechanical keyboard, and a load, such as a secondary hard disk drive and an optical disk drive. The conventional portable electronic apparatus is disadvantageous in that when the battery unit of the expansion module needs recharging, the battery unit has to be taken out of the expansion module.

In another conventional portable electronic apparatus that includes a notebook computer system module and an expansion module connected removably to the notebook computer system module. The notebook computer system module includes a first charging circuit coupled to a power source, and a first battery unit coupled to the first charging circuit. The expansion module includes a second charging circuit, and a second battery unit coupled to the second charging circuit. The second charging circuit of the expansion module is coupled to the power source only when the expansion module is connected to the notebook computer system module. Hence, charging of the first and second battery units is possible when the expansion module is connected to the notebook computer system module and when the first charging circuit is coupled to the power source. The conventional portable electronic apparatus is disadvantageous in that when the second battery unit needs recharging, the expansion module has to be connected to the notebook computer system module.

SUMMARY OF THE INVENTION

Therefore, the object of the present invention is to provide a portable electronic apparatus that includes system and expansion modules, each of which includes a battery unit that can be charged without requiring removal of the same from the respective one of the system and expansion modules and regardless of the connection state between the system and expansion modules.

According to the present invention, a portable electronic apparatus comprises a first module, a second module, a connecting unit, and a control unit. The first module includes a first charging circuit adapted to be coupled to a first power source, and a first battery unit coupled to the first charging circuit. The second module is connected removably to the first module, and includes a second charging circuit adapted to be coupled to a second power source, and a second battery unit coupled to the second charging circuit. The connecting unit is used to establish electrical connection between the first charging circuit and the second battery unit when the second module is connected to the first module. The control unit is coupled to the first charging circuit, enables the first and second battery units to be charged independently and respectively through the first and second charging circuits using the first and second power sources when the second module is disconnected from the first module, and enables the first and second battery units to be charged through the first charging circuit using the first power source when the second module is connected to the first module.

BRIEF DESCRIPTION OF THE DRAWING

Other features and advantages of the present invention will become apparent in the following detailed description of the preferred embodiment with reference to the accompanying drawing, of which.

DETAILED DESCRIPTION OF THE PREFERRED EMBODIMENT

Figure 1:
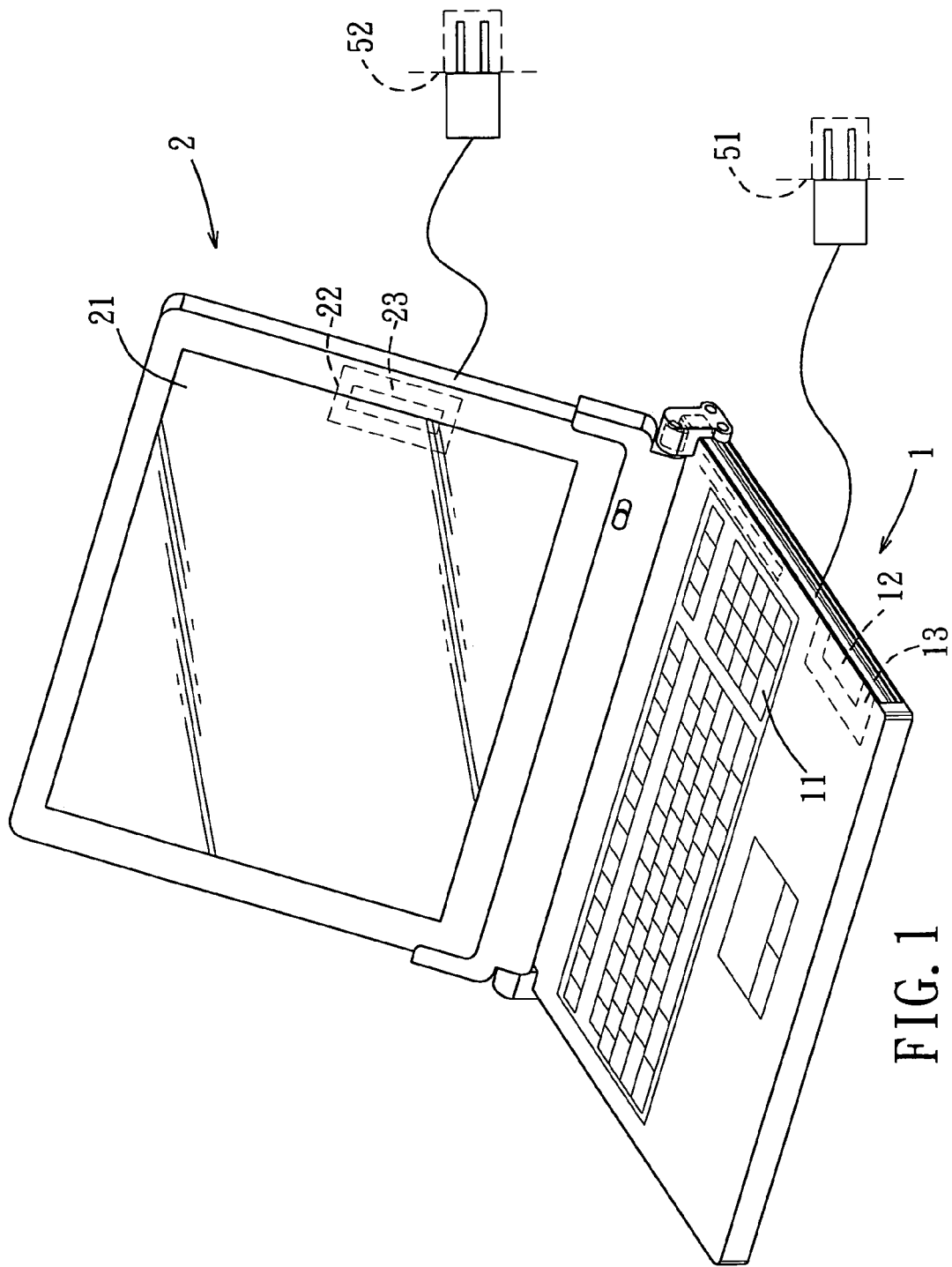
FIG. 1 is a perspective view of the preferred embodiment of a portable electronic apparatus according to the present invention.
Figure 2:
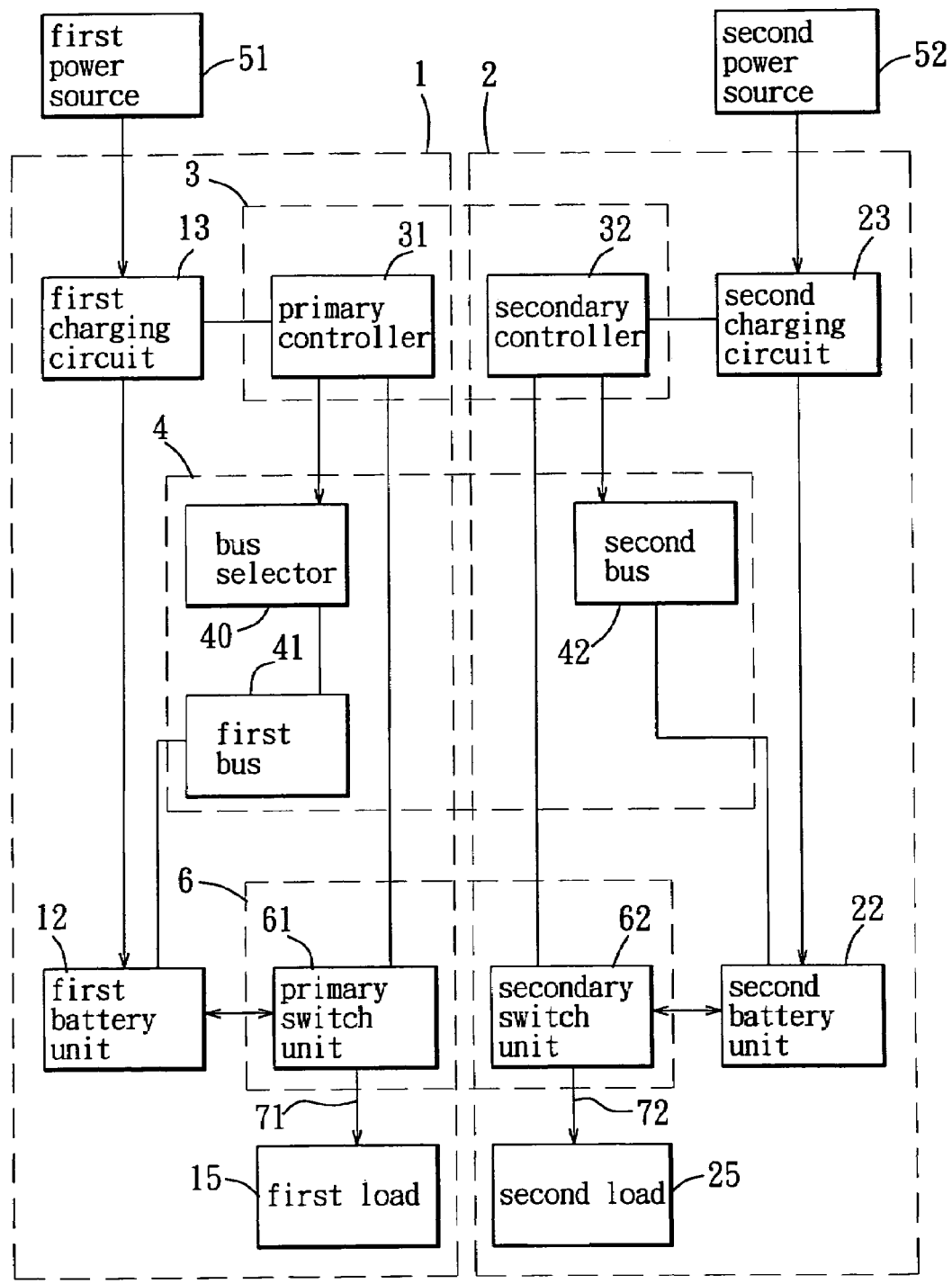
FIG. 2 is a schematic circuit block diagram to illustrate a state where a second module is disconnected from a first module.
Figure 3:
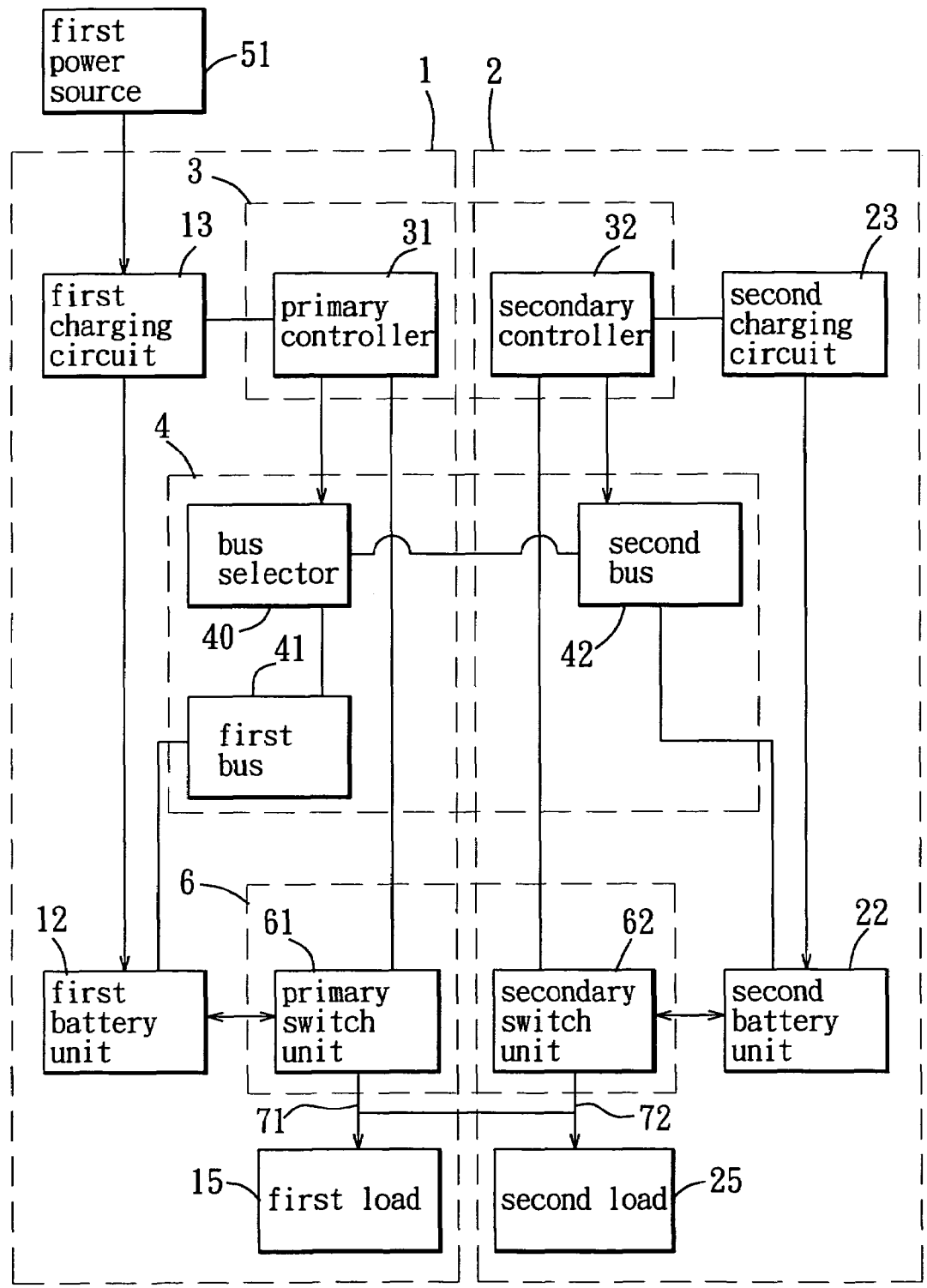
FIG. 3 is a schematic circuit block diagram to illustrate a state where the second module is connected to the first module.

Referring to FIGS. 1 to 3, the preferred embodiment of a portable electronic apparatus according to this invention is shown to include first and second modules 1, 2, a connecting unit 6, and a control unit 3.

The first module 1 includes a first charging circuit 13 adapted to be coupled to a first power source 51, and a first battery unit 12 coupled to the first charging circuit 13. In this embodiment, the first module 1 is an expansion module. As best shown in FIG. 1, the first module 1 further includes a mechanical keyboard 11, and a first load (indicated as 15 in FIGS. 2 and 3) coupled to the first battery unit 12 and the first charging circuit 13. The first load 15 includes a hard disk drive (not shown) and an optical disc drive (not shown).

The second module 2 is connected removably to the first module 1 in a known manner, and includes a second charging circuit 23 adapted to be coupled to a second power source 52, and a second battery unit 22 coupled to the second charging circuit 23. In this embodiment, the second module 2 is a tablet computer system module. As best shown in FIG. 1, the second module 2 further includes a second load (indicated as 25 in FIGS. 2 and 3) coupled to the second battery unit 22 and the second charging circuit 23. The second load 25 includes a touch control display panel 21, a motherboard (not shown), a central processing unit (not shown), and a hard disk drive (not shown).

Each of the first and second battery units 12, 22 includes a rechargeable battery cell (not shown). Preferably, the battery cells of the first and second battery units 12, 22 have the same specification. As such, the battery cell of the second battery unit 22 can be used as a backup for the first battery unit 12 of the first module 1. In an alternative embodiment, the battery cells of the first and second battery units 12, 22 have different specifications.

In this embodiment, the connecting unit 6 includes primary and secondary switch units 61, 62. The primary switch unit 61 is mounted in the first module 1, and is coupled to the first battery unit 12. A first coupler 71 connects the primary switch unit 61 to the first load 15. Similarly, the secondary switch unit 62 is mounted in the second module 2, and is coupled to the second battery unit 22. A second coupler 72 connects the secondary switch unit 62 to the second load 25.

In this embodiment, the control unit 3 includes primary and secondary controllers 31, 32. The primary controller 31 is mounted in the first module 1, is coupled to and controls charging operation of the first charging circuit 13, and is further coupled to and controls switching operation of the primary switch unit 61. On the other hand, the secondary controller 32 is mounted in the second module 2, is further coupled to and controls charging operation of the second charging circuit 23, and is coupled to and controls switching operation of the secondary switch unit 62.

The portable electronic apparatus further includes a data transmission unit 4. The data transmission unit 4 includes a bus selector 40, and first and second buses 41, 42. The bus selector 40 is mounted in the first module 1 and is coupled to the primary controller 31. The first bus 41 of the data transmission unit 4 is disposed in the first module 1 and couples the first battery unit 12 to the bus selector 40. The second bus 42 of the data transmission unit 4 is disposed in the second module 2 and couples the second battery unit 22 to the secondary controller 32.

It is noted that the bus selector 40 is mounted in the first module 1 so as to simplify circuit design of the second module 2. However, it should be apparent to those skilled in the art that the bus selector 40 may be mounted in the second module 2 so as to simplify circuit design of the first module 1.

As best shown in FIG. 2, when the second module 2 is disconnected from the first module 1, the control unit 3 enables the first and second battery units 12, 22 to be charged independently. That is, the primary controller 31 of the control unit 3 enables charging of the first battery unit 12 through the first charging circuit 13 using the first power source 51, whereas the secondary controller 32 enables charging of the second battery unit 22 through the second charging circuit 23 using the second power source 52. Furthermore, the first bus 41 and the bus selector 40 of the data transmission unit 4 permit transmission of status data of the first battery unit 12 to the primary controller 31. The primary controller 31 is thus able to control the charging operation of the first charging circuit 13 in accordance with the status data of the first battery unit 12. On the other hand, the second bus 42 of the data transmission unit 4 permits transmission of status data of the second battery unit 22 to the secondary controller 32. The secondary controller 31 is thus able to control the charging operation of the second charging circuit 23 in accordance with the status data of the second battery unit 22. The status data of the first battery unit 12 includes the product number and the charging state of the first battery unit 12, whereas the status data of the second battery unit 22 includes the product number and the charging state of the second battery unit 22.

As the switching operation of the primary switch unit 61 for enabling the first load 15 to receive electric power from the first power source 51 through the first charging circuit 13, and battery power from the first battery unit 13 is well known in the art, a detailed description thereof is omitted herein for the sake of brevity. Similarly, as the switching operation of the secondary switch unit 62 for enabling the second load 25 to receive electric power from the second power source 52 through the second charging circuit 23, and battery power from the second battery unit 22 is well known in the art, a detailed description thereof is similarly omitted herein for the sake of brevity.

As best shown in FIG. 3, when the second module 2 is connected to the first module 1, the second bus 42 is coupled to the bus selector 40, and the second coupler 72 is coupled to the first coupler 71. At this time, the data transmission unit 4 permits transmission of status data of each of the first and second battery units 12, 22 to the primary controller 31. As a consequence, the connecting unit 6 can be controlled to establish electrical connection between the first charging circuit 13 and the second battery unit 22. In particular, the primary switch unit 61 of the connecting unit 6 is controlled by the primary controller 31 to make electrical connection between the first charging circuit 13 and the secondary switch unit 62. On the other hand, the secondary switch unit 62 is controlled by the secondary controller 32 to make electrical connection between the primary switch unit 61 and the second battery unit 22. Thereafter, the primary controller 31 of the control unit 3 enables the first and second battery units 12, 22 to be charged through the first charging circuit 13 using the first power source 51.

It is noted that when the second module 2 is connected to the first module 1, data can be entered into the second module 2 through the mechanical keyboard 11 of the first module 1 in a conventional manner. Moreover, the second module 2 can read and write data into the hard disk drive of the first module 1 in a conventional manner. Further, the second module 2 can read data from an optical disc disposed in the optical disc drive of the first module 1 in a conventional manner.

It also noted that when the second module 2 is connected to the first module 1, and when the first and second charging circuits 13, 23 are disconnected from the first and second power sources 51, 52, respectively, the control unit 3 can be configured to control the primary and secondary switch units 61, 62 such that the primary switch unit 61 operates in conjunction with the secondary switch unit 62 so as to permit the first and second loads 15, 25 to receive battery power from both the first and second battery units 12, 22, so as to permit the first and second loads 15, 25 to receive battery power from either the first or second battery unit 12, 22, and so as to inhibit the first and second loads 15, 25 from receiving battery power from the first and/or second battery units 12, 22.

It is further noted that when the second module 2 is connected to the first module 1, and when the first charging circuit 13 is connected to the first power source 51, the control unit 3 can be configured to control the primary and secondary switch units 61, 62 such that the primary switch unit 61 operates in conjunction with the secondary switch unit 62 so as to permit the first and second loads 15, 25 to receive power from the first power source 51 through the first charging circuit 13.

In an alternative embodiment, the primary controller 31 is mounted in the second module 2 such that when the second module 2 is connected to the first module 1, the primary controller 31 enables the first and second battery units 12, 22 to be charged through the second charging circuit 23 using the second power source 52.

It has thus been shown that the portable electronic apparatus of this invention includes a first module 1, and a second module 2 connected removably to the first module 1. The first module 1 includes a first charging circuit 13 adapted to be coupled to a first power source 51, and a first battery unit 12 coupled to the first charging circuit 13. The second module 2 includes a second charging circuit 23 adapted to be coupled to a second power source 52, and a second battery unit 22 coupled to the second charging circuit 23. When the second module 2 is disconnected from the first module 1, the first and second battery units 12, 22 are charged independently and respectively by the first and second charging circuits 13, 23 using the first and second power sources 51, 52. The arrangement as such permits use of the second battery unit 22 as a backup for the first battery unit 12. When the second module 2 is connected to the first module 1, the first and second battery units 12, 22 are charged simultaneously by the first charging circuit 13 using the first power source 51. Therefore, charging time for the first and second battery units 12, 22 can be reduced in view of the possibility of simultaneous charging in the portable electronic apparatus of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A portable electronic apparatus comprising:
   a first module including a first charging circuit adapted to be coupled to a first power source, and a first battery unit coupled to said first charging circuit;
   a second module connected removably to said first module, and including a second charging circuit adapted to be coupled to a second power source, and a second battery unit coupled to said second charging circuit;
   a connecting unit for establishing electrical connection between said first charging circuit and said second battery unit when said second module is connected to said first module; and
   a control unit coupled to at least said first charging circuit;
   said control unit enabling said first and second battery units to be charged independently and respectively through said first and second charging circuits using the first and second power sources when said second module is disconnected from said first module;
   said control unit being coupled to and controlling said connecting unit for enabling said first and second battery units to be charged through said first charging circuit using the first power source when said second module is connected to said first module.

2. The portable electronic apparatus as claimed in claim 1, wherein said control unit includes a primary controller mounted in said first module, and coupled to and controlling charging operation of said first charging circuit.

3. The portable electronic apparatus as claimed in claim 2, wherein said connecting unit includes a primary switch unit mounted in said first module and coupled to and controlled by said primary controller to make electrical connection between said first charging circuit and said second battery unit when said second module is connected to said first module.

4. The portable electronic apparatus as claimed in claim 3, further comprising a data transmission unit coupled to said first and second battery units and said primary controller to permit transmission of status data of each of said first and second battery units to said primary controller when said second module is connected to said first module.

5. The portable electronic apparatus as claimed in claim 4, wherein said data transmission unit includes:
   a bus selector coupled to said primary controller;
   a first bus for coupling said first battery unit to said bus selector; and
   a second bus for coupling said second battery unit to said bus selector when said second module is connected to said first module.

6. The portable electronic apparatus as claimed in claim 4, wherein said control unit further includes a secondary controller mounted in said second module, and coupled to and controlling charging operation of said second charging circuit when said second module is disconnected from said first module.

7. The portable electronic apparatus as claimed in claim 6, wherein said connecting unit further includes a secondary switch unit mounted in said second module, and coupled to and controlled by said secondary controller to make electrical connection between said primary switch unit and said second battery unit when said second module is connected to said first module.

8. The portable electronic apparatus as claimed in claim 7, wherein said secondary controller is further coupled to said data transmission unit.

9. The portable electronic apparatus as claimed in claim 1, wherein said second module is a tablet computer system module.

10. The portable electronic apparatus as claimed in claim 9, wherein said first module is an expansion module that includes a mechanical keyboard.

* * * * *